Figure 1:
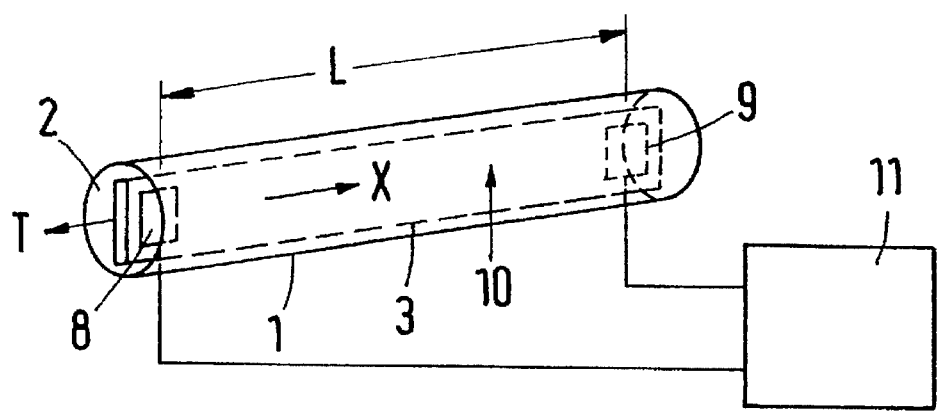

United States Patent [19]

Hansen

[11] Patent Number: 5,637,804

[45] Date of Patent: Jun. 10, 1997

[54] MASS FLOWMETER

[75] Inventor: Henning M. Hansen, Sønderborg, Denmark

[73] Assignee: Danfoss A/.S, Nordborg, Denmark

[21] Appl. No.: 553,107

[22] Filed: Nov. 3, 1995

[30] Foreign Application Priority Data

Nov. 19, 1994 [DE] Germany ............................ 44 41 225.8

[51] Int. Cl.⁶ ...................................................... G01F 1/78
[52] U.S. Cl. ...................................... 73/861.18; 73/861.357
[58] Field of Search ........................... 73/861.18, 861.19, 73/861.55, 861.357

[56] References Cited

U.S. PATENT DOCUMENTS

| | | | |
|---|---|---|---|
| 2,741,918 | 4/1956 | De Boisblanc | 73/861.18 |
| 3,190,116 | 6/1965 | Romanowski | 73/861.16 |
| 3,927,565 | 12/1975 | Pavlin et al. | 73/861.355 |
| 4,003,251 | 1/1977 | Herzl | 73/861.24 |
| 4,193,291 | 3/1980 | Lynnworth | 73/32 A |
| 4,420,983 | 12/1983 | Langdon | 73/861.18 |
| 4,596,153 | 6/1986 | Macdonald | 73/861.18 |
| 5,179,862 | 1/1993 | Lynnworth | 73/861.28 |
| 5,243,863 | 9/1993 | Gill | 73/861.28 |

FOREIGN PATENT DOCUMENTS 44 41 225  5/1996  Germany .

*Primary Examiner*—Richard Chilcot
*Assistant Examiner*—Jewel V. Artis
*Attorney, Agent, or Firm*—Lee, Mann, Smith, McWilliams, Sweeney & Ohlson

[57] ABSTRACT

A mass flowmeter has a flow-through channel (2) and as its measuring section (10) a thin strip (3) which at one end has an oscillation generator generating waves travelling along the measuring section (10) and at the other end has an energy converter (8, 9) acting as oscillation detector for these travelling waves. An evaluating circuit (11) determines the mass flow on the basis of the travelling speeds which are different in and against the direction of flow (X). In particular, only one measuring section (10) is provided, the energy converters (8, 9) of which are operable alternately as oscillation generator and oscillation detector. In this manner, meters of relatively short length and high accuracy can be made.

9 Claims, 2 Drawing Sheets

MASS FLOWMETER

The invention relates to a mass flowmeter, having a flow-through channel with at least one measuring section, which measuring section at one end has an energy converter acting as an oscillation generator generating waves travelling along the measuring section and at the other end has an energy converter acting as oscillation detector for these travelling waves, and having an evaluating circuit which determines the mass flow on the basis of the travelling speeds which are different in and against the direction of flow.

In a known meter of that kind (DE-OS 39 23 409), the measuring section is formed by means of a measuring tube bounding the flow-through channel. Utilization of the travelling waves has the advantage that neither because of zero-point drift nor because of the flow profile is a calibration required. It is to be regarded as a disadvantage that an excessive length of the measuring tube is needed when using a measuring tube of ordinary rigidity if one wishes to achieve optimum results.

In another known type of mass flowmeter (U.S. Pat. No. 4,596,153), a thin strip is arranged in the flow-through channel of a straight measuring tube, the thin strip being secured at one end and being freely movable at the other. The thin strip is energized with a resonant frequency by a centrally arranged oscillation generator so that a standing wave is formed. The phase difference between the measurements of an oscillation detector close to the fixed end and an oscillation detector close to the free end is evaluated to determine the mass flow. In this case, however, zero-point drift occurs, which requires appropriate compensation.

The invention is based on the problem of providing a mass flowmeter of the kind described in the introduction which has a high measuring accuracy even with its short length.

This problem is solved according to the invention in that the measuring section comprises a thin strip of resilient material which is arranged in the flow-through channel, is held fixedly at its ends, cooperates with the energy converters and is dimensioned so that its lowest natural frequency is much lower than the energizing frequency of the oscillation generator.

In this construction the resilient properties of the thin strip can be selected regardless of the required rigidity of the measuring tube. It is possible to operate at a high energizing frequency, so that the wave length of the travelling wave is small compared with the strip length. The transit time differences between with the flow measurement and against the flow measurement can therefore be determined very accurately and in a simple manner even in the case of short measuring sections. Taken as a whole, this therefore provides a mass flowmeter working with travelling waves and of an overall length that can compete with or is even shorter than meters operating on different principles.

Advantageously, only one measuring section is provided, the energy converters of which arranged close to the ends of the thin strip are operable alternately as oscillation generator and oscillation detector. The transit time in the flow direction and in the opposite direction can thus be determined very accurately, because the same measuring section is used.

The thin strip preferably runs along the axis of a straight flow-through channel. In this arrangement the influence of the flow is greatest.

It is advisable for the oscillation generators to induce the travelling waves as bending oscillations of the thin strip. The greatest resilient deformation and a correspondingly strong influence by the flow occurs in the bending direction.

The length of meter actually required depends primarily on the construction of the thin strip, that is, on the material thickness, the width of the strip and the material used. It is easily possible to make the length of the thin strip smaller than ten times the diameter, preferably smaller than five times the diameter of the flow-through channel.

It is especially advantageous for the thin strip to be kept under constant tensile stress by the fixing means. The effect of the tensile stress is that extremely thin and thus highly resilient strips can be used, the same travelling speed being provided for all energizing frequencies and therefore no lengthening of the pulse during the travel is effected for oscillation generation even for a broad band voltage pulse. Even relatively short measuring sections therefore suffice to achieve accurate results.

Under the proviso given hereby that the stiffness to bending of the strip can be ignored, it is advantageously possible for the evaluating circuit to calculate the mass flow $Q_m$ from the equation $$Q_m = K \times D_t \times \frac{T}{2L} \qquad [1]$$

wherein

K is a constant which depends on the strip data and the wavelength used, $D_t$ is the difference in the transit times of the travelling waves in and against the direction of flow, T is the tensile stress in the thin strip and L is the length of the measuring section.

Because of the simple structure of the equation, in which the transit time difference is the only variable, the evaluating circuit becomes less complicated.

It is also an advantage for the end of the thin strip to be held by a gripping means which between two walls extending approximately in the strip direction has a space separated from the flow-through channel, in which space the energy converter is arranged. In this manner, the oscillation generators and oscillation detectors can be housed in a region protected from the medium to be measured and which is also accessible from the outside. Using the two walls, bending oscillations can be transmitted to the thin strip in a simple manner.

In a further construction, provision is made for the end of the thin strip to be provided with a supporting element on which a spring element causing the tensile stress acts. In this manner a defined force is exerted on the thin strip.

Moreover, it is an advantage for the thin strip to run obliquely with respect to the axis of the flow-through channel and for its ends to engage in pockets which adjoin the flow-through channel externally. This oblique position of the strip is mainly used when the flow-through channel has a large cross-section.

Figure 2:
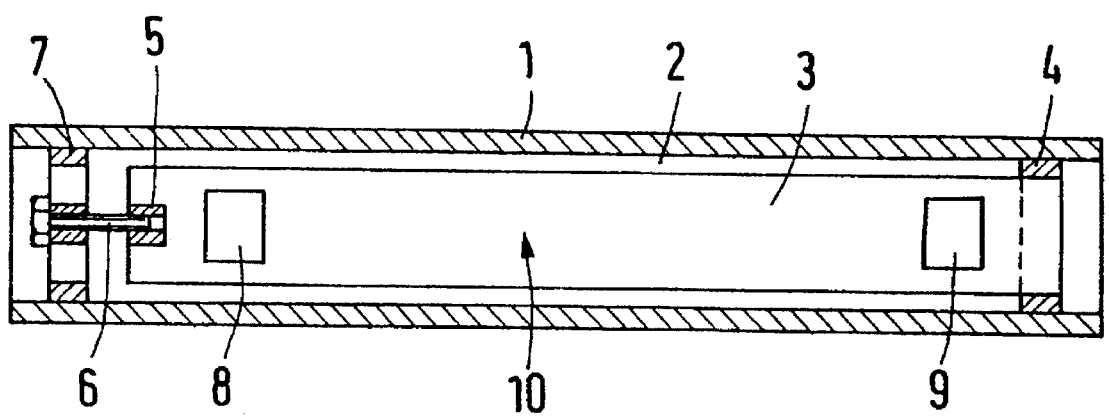
Figure 3:
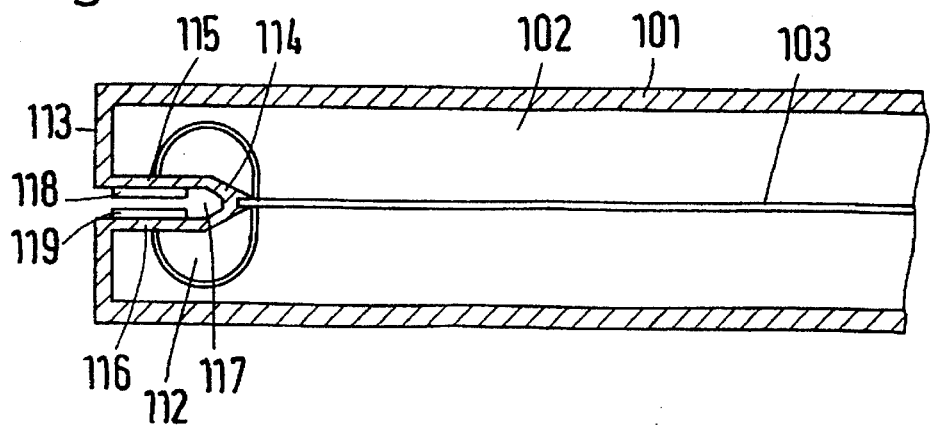
Figure 4:
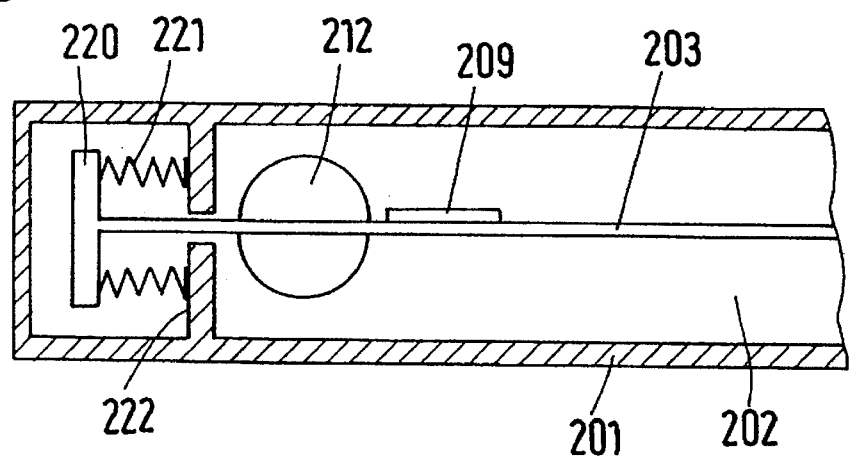
Figure 5:
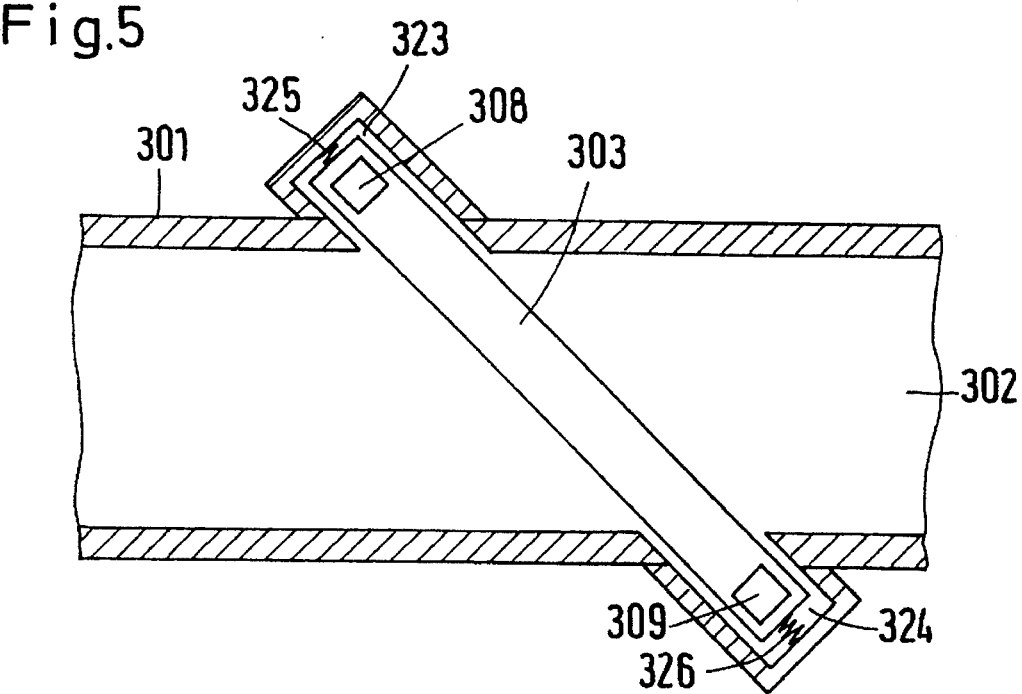

The invention is explained in greater detail hereinafter with reference to a preferred embodiment illustrated in the drawings, in which FIG. 1 is a diagrammatic representation of the mass flowmeter according to the invention, FIG. 2 is a longitudinal section through the measuring tube, FIG. 3 is a longitudinal section through part of a further embodiment, FIG. 4 is a longitudinal section through part of another embodiment, and FIG. 5 is a longitudinal section through part of a further embodiment.

A measuring tube 1 defines a flow-through channel 2 through which the flow is in the direction X. A thin strip 3 of resilient material which extends along the measuring tube axis is arranged in this flow-through channel. The thin strip 3 is secured at one end by means of fixing means 4 to the measuring tube 1 and at its other end carries a fixing means 5 which is put under tensile stress T by means of a screw 6 which bears against an abutment 7 arranged in the measuring tube 1.

Close to its ends, the thin strip 3 carries two energy converters 8 and 9, between which a measuring section 10 of length L extends. The energy converters 8 and 9 operate alternately as an oscillation generator, which generates waves travelling along the measuring section, and as an oscillation detector, which detects the travelling waves. An evaluation circuit 11 serves to produce the generator oscillations and to detect the travelling speeds of the travelling waves running in the flow direction and in the opposite direction.

The thin strip 3 consists of a resilient material, especially metal, such as brass, bronze or steel. The thickness of the strip is, to achieve the intended purpose, less than 0.5 mm, the range from 0.2 to 0.3 mm being preferred. The width of the strip is dependent on the tube dimensions.

It can be shown that equation [1] applies to the strip 3 put under tensile stress.

In FIG. 3 the measuring tube 101 is provided with a lateral inlet 112. The flow-through channel 102 is closed at its end by an end wall 113. The thin strip 103 arranged in the flow-through channel 102 is held in a gripping means 114 which comprises two parallel walls 115 and 116 which bound a space 117 separated from the flow-through channel 2. The two walls 115 and 116, which extend in the same direction as the thin strip 103, carry on their facing sides a respective energy converter 118 and 119 of piezoelectric material. Depending on the energization, the walls 115 and 116 bend in one or other direction and generate a travelling bending oscillation in the strip 103.

In the embodiment shown in FIG. 4, the measuring tube 201 is provided with a lateral inlet nozzle 212. In the flow-through channel 202 there is a thin strip 203 which is provided with an energy converter 209. The strip 203 is provided with a supporting element 220 on which a spring element 221 which bears against a transverse wall 222 of the measuring tube 201 acts. In this manner a defined tensile stress is produced in the strip 203. The spring element is illustrated as a bellows, but can alternatively be formed by an ordinary helical spring or similar means.

In the embodiment according to FIG. 5, the measuring tube 301 bounds a flow-through channel 302 of relatively large cross-section. A thin strip 303, which is provided close to each of its ends with a respective energy converter 308 and 309, extends obliquely with respect to the axis of the flow-through channel 302. The ends are located in pockets 323 and 324 which project laterally beyond the flow-through channel 302. That the thin strip 303 is secured at its ends under tensile stress is indicated by means of springs 325 and 326.

The oscillation generators can induce travelling waves in the form of displacement oscillations, torsional oscillations or other oscillations, in particular as bending oscillations. Energization can be effected with a broad band voltage pulse, but preferably, however, with a short pulse which has a well-defined frequency. Such an oscillation train of small band width is produced when a few sinusoidal oscillations, for example, 3 or 4 sinusoidal oscillations, are applied in an envelope which corresponds to the Gaussian function or bell curve. The oscillation generators can be operated electromagnetically, electrostatically, piezoelectrically, hydraulically, magnetically, magnetostrictively or in some other known manner. The oscillation detectors can be of similar construction. They can respond to the position, the speed or the acceleration of the thin strip. From the signals obtained, the start of the travelling wave, for example, a predetermined positive zero passage, can then be determined. Equally, however, the oscillation detectors can operate optically, piezoelectrically, electromagnetically, magnetostrictively, or electrostatically, or be constructed as strain gauges or operated in some other known manner.

For further details the reader is referred to DE-OS 39 23 409. This applies particularly in respect of the construction of the energizing and evaluating circuit 11. It can also contain in particular a control circuit for the energizing frequency of the oscillation generator which keeps the wavelength of the wave travelling along the thin strip 3 constant. When the strip 3 is under tensile stress, it is possible to use a simple, and therefore inexpensive, evaluating circuit 11, because it is then possible to operate with the simplified equation [1], if desired after correction by a factor.

The features of different embodiments can, of course, be combined with one another, for example, the manner shown in FIG. 3 of fixing the strip can also be applied in the embodiment shown in FIG. 5.

I claim:

1. A mass flowmeter for determining mass flow and having a flow-through channel with at least one measuring section, which measuring section at one end has an energy converter acting as an oscillation generator generating waves travelling along the measuring section and at the other end has an energy converter acting as oscillation detector for said travelling waves, and having an evaluating circuit which determines the mass flow on the basis of travelling speeds which are different in and against the direction of flow, and in which the measuring section comprises a thin strip of resilient material which is arranged in the flow-through channel, means holding said thin strip fixedly at its ends, said thin strip cooperating with said energy converters and being dimensioned so that a lowest natural frequency of said strip is much lower than an energizing frequency of the oscillation generator.

2. A meter according to claim 1, having only one measuring section, the energy converters of which arranged close to the ends of the thin strip being operable alternately as the oscillation generator and the oscillation detector.

3. A meter according to claim 1, in which the thin strip runs along the axis of a straight flow-through channel.

4. A meter according to claim 1, in which the oscillation generators induce the travelling waves as bending oscillations of the thin strip.

5. A meter according to claim 1, in that the thin strip is kept under constant tensile stress (T) by a fixing means.

6. A meter according to claim 5, in which the evaluating circuit calculates the mass flow $Q_m$ from the equation $$Q_m = K \times D_t \times \frac{T}{2L} \qquad [1]$$

wherein

K is a constant which depends on the strip data and the wavelength used, $D_t$ is the difference in the transit times of the travelling waves in and against the direction of flow, T is the tensile stress in the thin strip and L is the length of the measuring section.

7. A meter according to claim 1, in which one end of the thin strip is held by a gripping means which, between two walls extending approximately parallel to the strip, has a space separated from the flow-through channel, the energy converter being located in said space.

8. A meter according to claim 1, in which one end of the thin strip has a supporting element on which a spring element acts causing the tensile stress.

9. A meter according to claim 1, in which the thin strip runs obliquely with respect to a longitudinal axis of the flow-through channel and opposite ends of the thin strip engage in pockets which adjoin the flow-through channel.

* * * * *